United States Patent
Yagi

(10) Patent No.: US 9,423,991 B2
(45) Date of Patent: Aug. 23, 2016

(54) INFORMATION PROCESSING APPARATUS, INFORMATION PROCESSING SYSTEM, AND INFORMATION PROCESSING METHOD

(71) Applicant: Atsuko Yagi, Kanagawa (JP)

(72) Inventor: Atsuko Yagi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/642,938

(22) Filed: Mar. 10, 2015

(65) Prior Publication Data

US 2015/0268908 A1    Sep. 24, 2015

(30) Foreign Application Priority Data

Mar. 18, 2014 (JP) .................................. 2014-054477

(51) Int. Cl.
*G06F 3/12* (2006.01)
*G06F 9/50* (2006.01)
*G06F 17/24* (2006.01)
*G06Q 10/06* (2012.01)

(52) U.S. Cl.
CPC ........... *G06F 3/1253* (2013.01); *G06F 3/1212* (2013.01); *G06F 9/5038* (2013.01); *G06F 17/24* (2013.01); *G06Q 10/06* (2013.01)

(58) Field of Classification Search
None
See application file for complete search history.

(56) References Cited

U.S. PATENT DOCUMENTS

| 8,179,542 B2* | 5/2012 | Yagi ................. G06F 17/30011 358/1.13 |
| 2007/0220425 A1* | 9/2007 | Matulic ............... G06Q 10/107 715/234 |
| 2011/0197154 A1* | 8/2011 | Corona .................... G06F 8/34 715/769 |
| 2012/0159503 A1 | 6/2012 | Shafiee et al. |

FOREIGN PATENT DOCUMENTS

JP    2008-097586    4/2008

OTHER PUBLICATIONS

Extended European Search Report dated Apr. 28, 2016.

* cited by examiner

*Primary Examiner* — Marivelisse Santiago Cordero
*Assistant Examiner* — Neil R McLean
(74) *Attorney, Agent, or Firm* — IPUSA, PLLC

(57) ABSTRACT

An information processing apparatus includes a process control unit that executes one or more process units with respect to input data in an order defined by definition information, an output unit that causes information to be output in a form changeable by a user when a first process unit of the process units is stopped, and an accepting unit that accepts changed information corresponding to the information output by the output unit that is changed by the user. The information output by the output unit includes output information of a process unit executed before the first process unit and/or input information set up in the definition information with respect to a process unit to be executed after the first process unit. The process control unit controls execution of the process unit to be executed after the first process unit based on the changed information accepted by the accepting unit.

9 Claims, 14 Drawing Sheets

FIG.7

```
<flow>
  <id>Flow1</id> ~510
  <plug-in order="1">
    <id>ocr</id>
    <displayName>OCR</displayName>
    <parameters>
      <keyword type="string" r="true" w="true"> </keyword> ~521
      --------------------------------
      --------------------------------
    </parameters>
  </plug-in>                                                                    520
                                                                                530
  <plug-in order="2">
    <id>suspend</id>
    <displayName>Job Suspend</displayName>
    <parameters>
      <panel type="string" r="false" w="false">mfp</panel> ~531            532
      <panelAddress type="string" r="false" w="false">111.111.111.111</panelAddress>
      <panelSize type="string" r="false" w="false">WVGA</panelSize> ~533
      <maxWaitingTime type="number" r="false" w="false">3600</maxWaitingTime> ~534
      <errorHandling type="string" r="false" w="false">Skip</errorHandling> ~535    536
      <displayParameter type="string" r="true" w="true">ocr/keyword</displayParameter>
      <displayParameter type="string" r="true" w="true">smtp/to1</displayParameter> ~537
      <displayParameter type="string" r="true" w="true">smtp/cc1</displayParameter> ~538
      <displayParameter type="string" r="true" w="true">smtp/cc2</displayParameter> ~539
      --------------------------------
      --------------------------------
    </parameters>
  </plug-in>

<plug-in order="3">
    <id>smtp</id>
    <displayName>Send to Email</displayName>                                    540
    <parameters>
      <serverIp type="string" r="false" w="false">111.111.111.111</serverIp> ~541
      <portNumber type="number" r="false" w="false">25</portNumber> ~542
      <to1 type="string" r="true" w="true">xxx1@abc.com</to1> ~543
      <cc1 type="string" r="true" w="true">xxx2@abc.com</cc1> ~544
      <cc2 type="string" r="true" w="true">xxx3@abc.com</cc2> ~545
      <subject type="string" r="false" w="false">{ocr/keyword}</subject> ~546
      --------------------------------
      --------------------------------
    </parameters>
  </plug-in>
<flow>
```

```
<jobInfo>
  <id>111-222-333-444</id> ~610
  <flow>
    <id>Flow1</id> ~510
    <plug-in order="1">
      <id>ocr</id>
      <displayName>OCR</displayName>
      <parameters>
        <keyword type="string" r="true" w="true"> </keyword> ~521
        ----------------------------
        ----------------------------
      </parameters>
    </plug-in>                                                              520
                                                                            530
    <plug-in order="2">
      <id>suspend</id>
      <displayName>Job Suspend</displayName>
      <parameters>
        <panel type="string" r="false" w="false">mfp</panel> ~531
        <panelAddress type="string" r="false" w="false">111.111.111.111</panelAddress> ~532
        <panelSize type="string" r="false" w="false">WVGA</panelSize> ~533
        <maxWaitingTime type="number" r="false" w="false">3600</maxWaitingTime> ~534
        <errorHandling type="string" r="false" w="false">Skip</errorHandling> ~535
        <displayParameter type="string" r="true" w="true">ocr/keyword</displayParameter> ~536
        <displayParameter type="string" r="true" w="true">smtp/to1</displayParameter> ~537
        <displayParameter type="string" r="true" w="true">smtp/cc1</displayParameter> ~538
        <displayParameter type="string" r="true" w="true">smtp/cc2</displayParameter> ~539
        ----------------------------
        ----------------------------
      </parameters>
    </plug-in>

<plug-in order="3">
      <id>smtp</id>
      <displayName>Send to Email</displayName>                              540
      <parameters>
        <serverIp type="string" r="false" w="false">111.111.111.111</serverIp> ~541
        <portNumber type="number" r="false" w="false">25</portNumber> ~542
        <to1 type="string" r="true" w="true">xxx1@abc.com</to1> ~543
        <cc1 type="string" r="true" w="true">xxx2@abc.com</cc1> ~544
        <cc2 type="string" r="true" w="true">xxx3@abc.com</cc2> ~545
        <subject type="string" r="false" w="false">[ocr/keyword]</subject> ~546
        ----------------------------
        ----------------------------
      </parameters>
    </plug-in>
  <flow>
  ----------------------------
  ----------------------------
<jobInfo>
```

FIG.9

```
<jobInfo>
  <id>111-222-333-444</id>                                              —610
  <flow>
    <id>Flow1</id>                                                      —510
    <plug-in order="1">                                                          520
      <id>ocr</id>
      <displayName>OCR</displayName>
      <parameters>
        <keyword type="string" r="true" w="true">abc</keyword>          —521
          ----------------------------------.
          ----------------------------------.
      </parameters>
    </plug-in>                                                                   530
    <plug-in order="2">
      <id>suspend</id>
      <displayName>Job Suspend</displayName>
      <parameters>
        <panel type="string" r="false" w="false">mfp</panel>            —531
        <panelAddress type="string" r="false" w="false">111.111.111.111</panelAddress> —532
        <panelSize type="string" r="false" w="false">WVGA</panelSize>   —533
        <maxWaitingTime type="number" r="false" w="false">3600</maxWaitingTime> —534
        <errorHandling type="string" r="false" w="false">Skip</errorHandling>  —535
        <displayParameter type="string" r="true" w="true">ocr/keyword</displayParameter> —536
        <displayParameter type="string" r="true" w="true">smtp/to1</displayParameter> —537
        <displayParameter type="string" r="true" w="true">smtp/cc1</displayParameter> —538
        <displayParameter type="string" r="true" w="true">smtp/cc2</displayParameter> —539
          ----------------------------------.
          ----------------------------------.
      </parameters>
    </plug-in>
    <plug-in order="3">                                                          540
      <id>smtp</id>
      <displayName>Send to Email</displayName>
      <parameters>
        <serverIp type="string" r="false" w="false">111.111.111.111</serverIp> —541
        <portNumber type="number" r="false" w="false">25</portNumber>   —542
        <to1 type="string" r="true" w="true">xxx1@abc.com</to1>         —543
        <cc1 type="string" r="true" w="true">xxx2@abc.com</cc1>         —544
        <cc2 type="string" r="true" w="true">xxx3@abc.com</cc2>         —545
        <subject type="string" r="false" w="false">{ocr/keyword}</subject> —546
          ----------------------------------.
          ----------------------------------.
      </parameters>
    </plug-in>
  <flow>
    ----------------------------------.
    ----------------------------------.
<jobInfo>
```

OCR keyword | abc | ~811

Send to Email to1 | xxx1@abc.com | ~812 cc1 | xxx2@abc.com | ~813 cc2 | xxx3@abc.com | ~814

810

815

Resume

FIG.14

```
<jobInfo>
  <id>111-222-333-444</id>  ─610
  <flow>
    <id>Flow1</id> ─510
    ┌─────────────────────────────────────────────────────────────────┐
    │ <plug-in order="1">                                             │
    │   <id>ocr</id>                                              520 │
    │   <displayName>OCR</displayName>                                │
    │   <parameters>                                                  │
    │     <keyword type="string" r="true" w="true">def</keyword> ─521 │
    │     ------------------------------                              │
    │     ------------------------------                              │
    │   </parameters>                                                 │
    │ </plug-in>                                                  530 │
    ├─────────────────────────────────────────────────────────────────┤
    │ <plug-in order="2">                                             │
    │   <id>suspend</id>                                              │
    │   <displayName>Job Suspend</displayName>                        │
    │   <parameters>                                                  │
    │     <panel type="string" r="false" w="false">mfp</panel> ─531   │
    │     <panelAddress type="string" r="false" w="false">111.111.111.111</panelAddress> ─532 │
    │     <panelSize type="string" r="false" w="false">WVGA</panelSize> ─533 │
    │     <maxWaitingTime type="number" r="false" w="false">3600</maxWaitingTime> ─534 │
    │     <errorHandling type="string" r="false" w="false">Skip</errorHandling> ─535 │
    │     <displayParameter type="string" r="true" w="true">ocr/keyword</displayParameter> ─536 │
    │     <displayParameter type="string" r="true" w="true">smtp/to1</displayParameter> ─537 │
    │     <displayParameter type="string" r="true" w="true">smtp/cc1</displayParameter> ─538 │
    │     <displayParameter type="string" r="true" w="true">smtp/cc2</displayParameter> ─539 │
    │     ------------------------------                              │
    │     ------------------------------                              │
    │   </parameters>                                                 │
    │ </plug-in>                                                      │
    ├─────────────────────────────────────────────────────────────────┤
    │ <plug-in order="3">                                             │
    │   <id>smtp</id>                                             540 │
    │   <displayName>Send to Email</displayName>                      │
    │   <parameters>                                                  │
    │     <serverIp type="string" r="false" w="false">111.111.111.111</serverIp> ─541 │
    │     <portNumber type="number" r="false" w="false">25</portNumber> ─542 │
    │     <to1 type="string" r="true" w="true">xxx3@abc.com</to1> ─543 │
    │     <cc1 type="string" r="true" w="true">xxx2@abc.com</cc1> ─544 │
    │     <cc2 type="string" r="true" w="true">xxx4@abc.com</cc2> ─545 │
    │     <subject type="string" r="false" w="false">[ocr/keyword]</subject> ─546 │
    │     ------------------------------                              │
    │     ------------------------------                              │
    │   </parameters>                                                 │
    │ </plug-in>                                                      │
    └─────────────────────────────────────────────────────────────────┘
  <flow>
  ------------------------------
<jobInfo>
  ------------------------------
```

600c

INFORMATION PROCESSING APPARATUS, INFORMATION PROCESSING SYSTEM, AND INFORMATION PROCESSING METHOD

BACKGROUND OF THE INVENTION

1. Field of the Invention

The present invention relates to an information processing apparatus, an information processing system, and an information processing method.

2. Description of the Related Art

Systems are known that are capable of executing a pre-defined workflow with respect to image data of a document scanned by an image forming apparatus (see e.g. Japanese Laid-Open Patent Publication No. 2008-97586). In such systems, a workflow is defined such that data may flow in accordance with the business operation flow of a user.

One workflow is basically made up of a combination of process units including a data input process of inputting data, zero or more intermediate processes performed on the input data, and a data output process of outputting the data generated by the above zero or more intermediate processes, for example.

However, there are cases where successive and automatic execution of process units constituting a workflow is not desired. For example, some workflows may involve waiting for a user input during execution of the workflow and executing subsequent process units of the workflow based on the user input.

SUMMARY OF THE INVENTION

In view of the above, an aspect of the present invention is directed to enhancing flexibility of a process flow that is made up of a combination of process units.

According to one embodiment of the present invention, an information processing apparatus includes a process control unit configured to execute one or more process units with respect to input data in an order defined by definition information, an output unit configured to cause information to be output in a form changeable by a user when a first process unit of the one or more process units is stopped, and an accepting unit configured to accept changed information corresponding to the information output by the output unit that is changed by the user. The information output by the output unit includes at least one of output information of a process unit executed before the first process unit and input information set up in the definition information with respect to a process unit to be executed after the first process unit. The process control unit controls execution of the process unit to be executed after the first process unit based on the changed information accepted by the accepting unit.

BRIEF DESCRIPTION OF THE DRAWINGS

FIG. 7 illustrates an example of flow definition data according to an embodiment of the present invention;

FIG. 8 illustrates an example of job definition data at an initial state according to an embodiment of the present invention;

FIG. 9 illustrates an example of job definition data after executing an OCR process according to an embodiment of the present invention;

FIG. 12 illustrates an exemplary display of a parameter edit screen before parameter information is edited;

FIG. 14 illustrates an example of job definition data after the parameter information is changed according to an embodiment of the present invention.

DESCRIPTION OF THE PREFERRED EMBODIMENTS

In the following, embodiments of the present invention are described with reference to the accompanying drawings.

Figure 1:
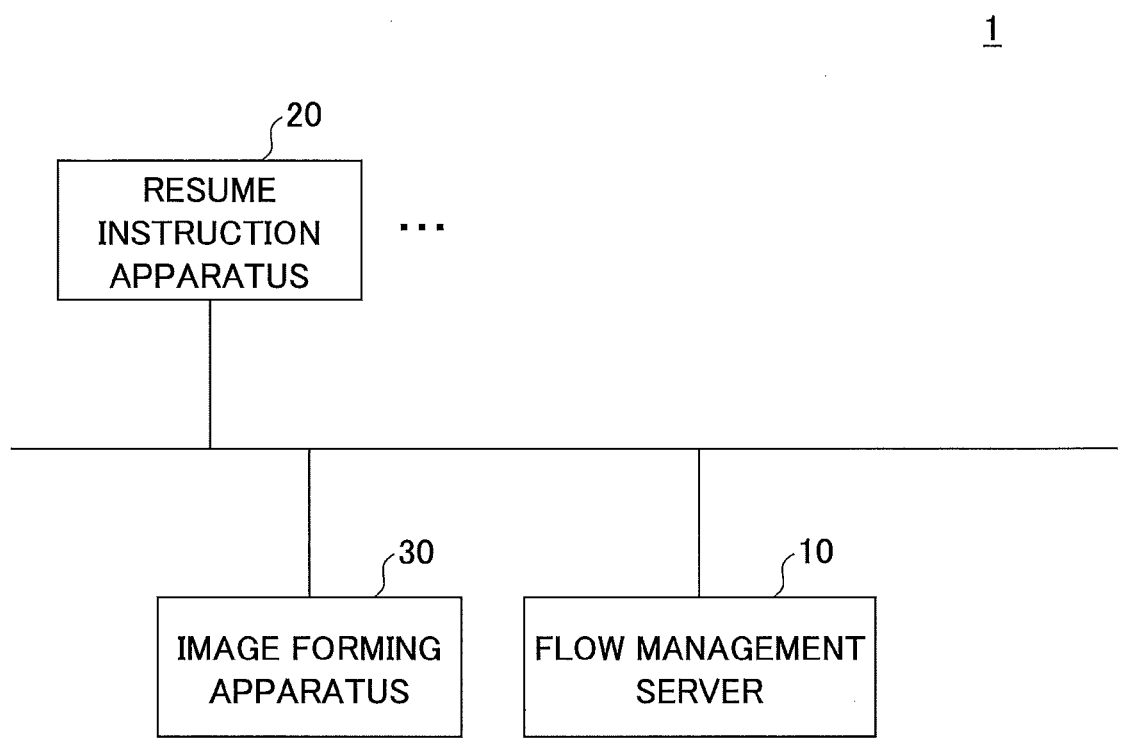
FIG. 1 illustrates an exemplary configuration of an information processing system according to an embodiment of the present invention.

FIG. 1 illustrates an exemplary configuration of an information processing system 1 according to an embodiment of the present invention. In FIG. 1, the information processing system 1 includes a flow management server 10, at least one resume instruction apparatus 20, and at least one image forming apparatus 30 that are interconnected by a network (which may be wired or wireless) such as a LAN (Local Area Network) or the Internet.

The flow management server 10 is a computer that executes a pre-defined workflow with respect to data received via a network. Note that a workflow may refer to a process flow implemented by a given combination of one or more process units (tasks) each implementing a discrete function independently or on their own, for example. Note that the process unit described above may correspond to a so-called "activity" in general workflow terminology.

The resume instruction apparatus 20 is used for inputting a resume instruction for resuming process operations of a workflow that has been temporarily stopped (workflow in a stopped state). That is, in the present embodiment, a workflow that can be temporarily stopped (suspended) can be executed. The resume instruction apparatus 20 may be implemented by a PC (personal computer), a smartphone, a tablet terminal, the flow management server 10, or the image forming apparatus 30, for example.

The image forming apparatus 30 is an example of an input source of data (input data) to be processed by a workflow. For example, the image forming apparatus 30 may transmit (input) image data scanned from a document to the flow management server 10 as input data for a workflow. Note that the data for the workflow may be input to a predetermined file of a predetermined folder of a predetermined file server, for example. Also, the data for the workflow may be transmitted by email, for example. Further, the data for the workflow may be stored as a file in a cloud storage, for example.

Figure 2:
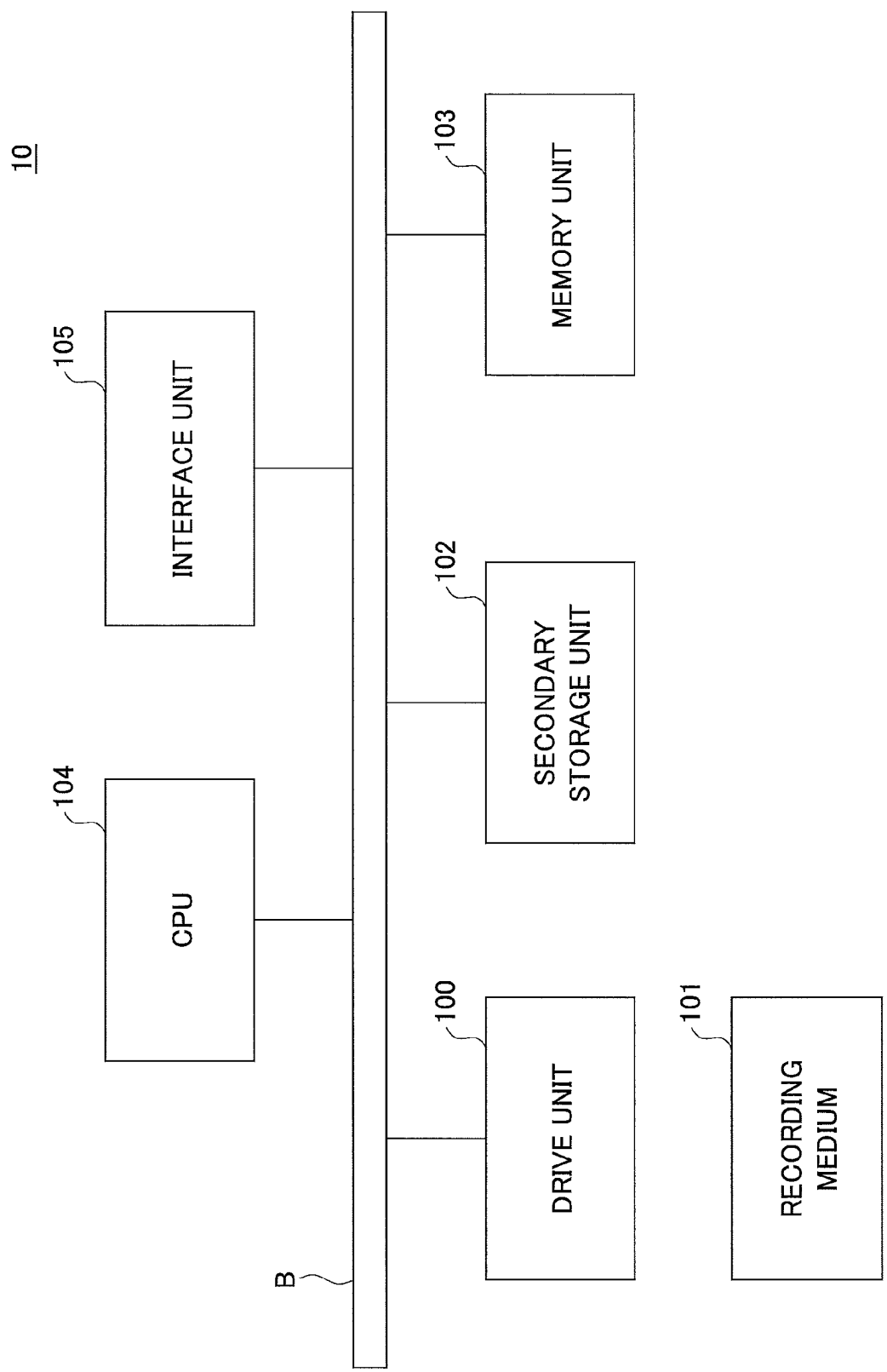
FIG. 2 illustrates an exemplary hardware configuration of a flow management server according to an embodiment of the present invention.

FIG. 2 illustrates an exemplary hardware configuration of the flow management server 10 according to an embodiment of the present invention. In FIG. 2, the flow management server 10 includes a drive unit 100, a secondary storage unit 102, a memory unit 103, a CPU (central processing unit) 104, and an interface unit 105 that are interconnected by a bus B.

A program for executing a process at the flow management server 10 may be provided by a recording medium 101 such as a CD-ROM. When the recording medium 101 storing the program is loaded into the drive unit 100, the program may be installed on the secondary storage unit 102 from the recording medium 101 via the drive unit 100. The program, however, does not necessarily have to be installed from the recording medium 101, and may alternatively be downloaded from some other computer via a network, for example. The secondary storage unit 102 stores files and data in addition to installed programs.

The memory unit 103 reads a program from the secondary storage unit 102 and stores the read program in response to an instruction to activate the program. The CPU 104 implements a function of the flow management server 10 by executing a relevant program stored in the memory unit 103. The interface unit 105 is used as an interface for establishing connection with a network.

Note that in some embodiments, the flow management server 10 may be configured by a computer system including a plurality of computers, for example.

Figure 3:
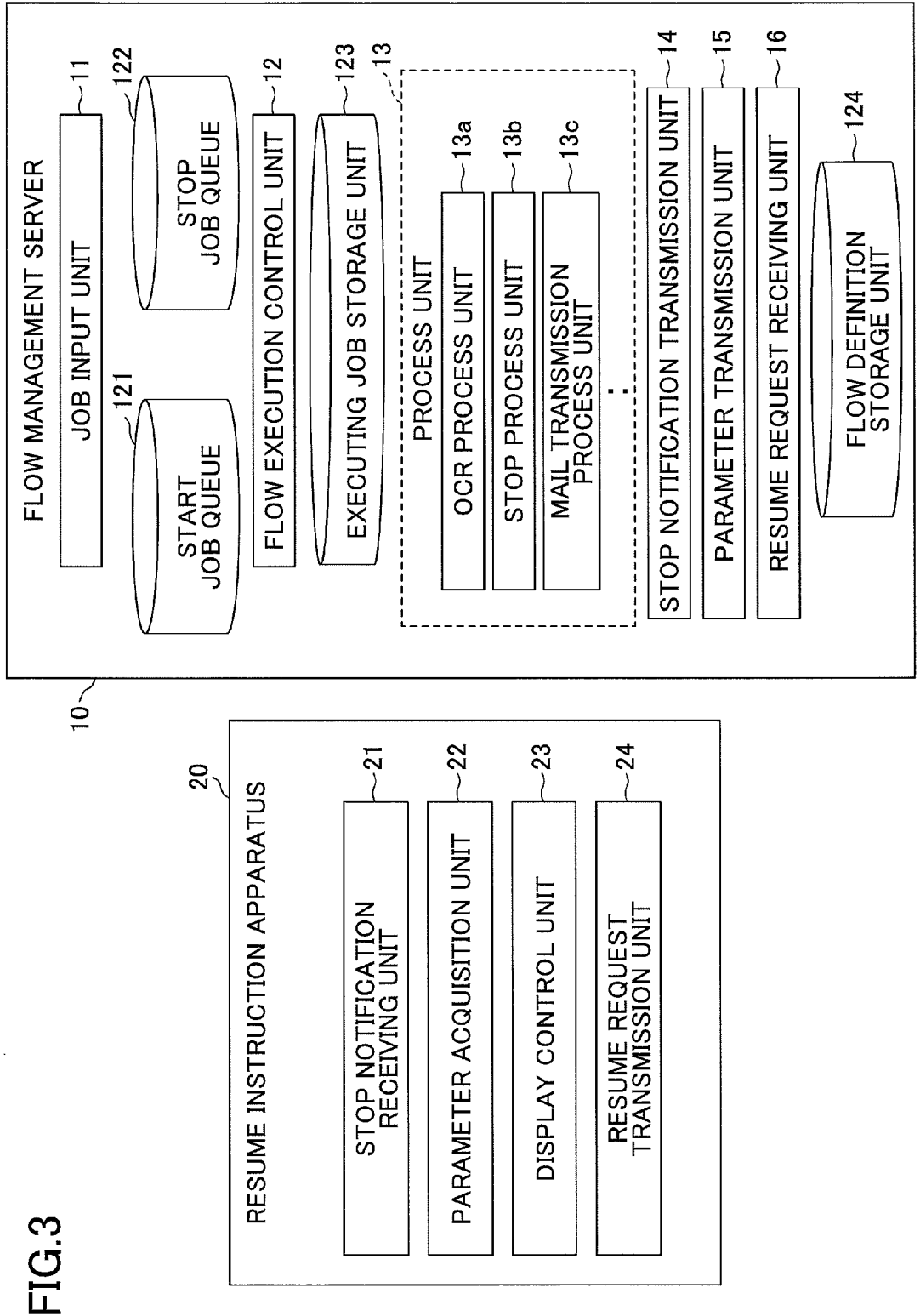
FIG. 3 illustrates exemplary functional configurations of the flow management server and a resume instruction apparatus according to an embodiment of the present invention.

FIG. 3 illustrates exemplary functional configurations of the flow management server 10 and the resume instruction apparatus 20.

In FIG. 3, the flow management server 10 includes a job input unit 11, a flow execution control unit 12, a process unit 13, a stop notification transmission unit 14, a parameter transmission unit 15, and a resume request receiving unit 16. These functional units may be implemented by the CPU 104 executing a relevant program installed on the flow management server 10, for example. The flow management server 10 also implements storage units including a start job queue 121, a stop job queue 122, an executing job storage unit 123, and a flow definition storage unit 124. These storage units may be implemented by the secondary storage unit 102 or a storage device connected to the flow management server 10 via a network, for example.

The flow definition storage unit 124 stores flow definition data. Flow definition data refers to data including definition information relating to the process flow of a workflow. In the present embodiment, one set of flow definition data corresponds to one workflow. Accordingly, flow definition data is created for every workflow that has a different process flow from another workflow.

The job input unit 11 receives a workflow execution request and input data for the workflow specified in the workflow execution request, and inputs job information relating to a job for executing the workflow to the start job queue 121. In the present embodiment, a job for executing a workflow refers to an execution unit for executing the workflow. For example, in a case where the same workflow is executed multiple times, each execution of the workflow corresponds to a different job. Note that in the descriptions below, a job of a workflow is referred to as "flow job".

The start job queue 121 may store the job information input thereto in FIFO (First-In First-Out) format, for example. The job information may include job definition data that is generated based on a copy of flow definition data of a workflow to be executed and data to be processed such as image data transmitted from the image forming apparatus 30. Note that in some embodiments, job information relating to one flow job may be stored and managed in one folder, for example.

When job information is stored in the start job queue 121, the flow execution control unit 12 moves the job information to the executing job storage unit 123 that is accessible by the process unit 13. The flow execution control unit 12 controls execution of a flow job based on job information stored in the executing job storage unit 123. In other words, the process unit 13 refers to the job information stored in the executing job storage unit 123 to execute a corresponding process of the process unit 13. Note that in some embodiments, the executing job storage unit 123 may be created for each flow job, for example.

The process unit 13 executes a process ("activity" or "process unit") constituting a workflow. In one example, one activity may be implemented by one process unit 13. In this case, a workflow may be implemented by a series of connected processes executed by one or more process units 13 each configured to execute a different process, for example.

In the present embodiment, one or more process units constituting a workflow to be executed by the flow management server 10 may be generally classified into an input process, an intermediate process, a stop process, or an output process. The input process may include a process of inputting data for a flow job from an external device such as the image forming apparatus 30, for example.

The intermediate process may include a process of modifying or manipulating data for a flow job, for example. Specific examples of an intermediate process include a noise removal process, an OCR (Optical Character Recognition) process, a translation process, and a data conversion process.

The stop process may include a process of temporarily stopping (suspending) the progress of a flow job in order to enable a user to intervene in the execution of the flow job. The stopped state of the flow job may be maintained until a resume instruction to resume the flow job is issued, for example.

The output process may include a process of outputting data generated by the flow job in a form usable by a user. Examples of outputting data in a form usable by the user include not only printing data on paper, but also electronically storing data or outputting data in other ways to enable the user to access and use the data via an application program, for example. In one example, the output process may be a delivery process for delivering data to a folder of a predetermined computer. In another example, a predetermined email address may be the delivery destination of the data. Also, the image forming apparatus 30 corresponding to the input source of image data or some other image forming apparatus 30 may be the delivery destination of the data. In this case, the image forming apparatus 30 corresponding to the delivery destination may print out the delivered data.

In FIG. 3, an OCR process unit 13a, a stop process unit 13b, and a mail transmission unit 13c are illustrated as examples of the process unit 13. The OCR process unit 13a executes an OCR process on data to be processed. The stop process unit 13b executes a stop process. That is, the stop process unit 13b temporarily stops (suspends) a flow job that is being executed and enables a user to intervene in the execution of the flow job. The mail transmission process unit 13c transmits an email including an attachment of data to be processed to a predetermined email address. Note that each process unit 3 may be implemented by the CPU 104 executing an independent program module, for example. In the descriptions below, a program module for enabling the flow management server 10 (CPU 104) to implement the function of the process unit 13 is referred to as a "plugin".

When a stop process is executed during execution of a flow job and the flow job transitions to a stopped state, the stop notification transmission unit 14 transmits a flow job stop notification to the resume instruction apparatus 20 that is set up as a transmission destination of the stop notification in the job definition data of the corresponding flow job. The parameter transmission unit 15 responds to a request from the resume instruction apparatus 20 corresponding to the transmission destination of the flow job stop notification, and transmits (outputs) to the resume instruction apparatus 20 one or more parameter values (parameter information) that may be changed (edited) by a user. The parameter information output by the parameter transmission unit 15 constitutes a part of parameters used for controlling execution of the flow job. That is, the transmission destination of the flow job stop notification becomes the output destination of the parameter information. For example, the parameter information may include output information of a process unit whose execution order comes before the stop process executed by stop process unit 13b and/or input information set up in the job definition data with respect to a process unit whose execution order comes after the stop process executed by stop process unit 13b. Note that information indicating the parameters that can be changed by the user (parameters corresponding to output objects) may be defined in the flow definition data that is used to create the corresponding job definition data, for example. Note that in some embodiments, the stop notification transmission unit 14 may be configured to transmit the parameter information along with the flow job stop notification, for example.

The resume request receiving unit 16 receives from the resume instruction apparatus 20 a resume request relating to the flow job that is currently suspended. When the resume request is received, execution of the flow job that is suspended may be resumed. Note that the resume request for the flow job may include changes made to the parameter values that have been transmitted to the resume instruction apparatus 20 from the parameter transmission unit 15. In this case, the execution of the flow job that is resumed may be controlled based on the changed parameter values (changed information).

The resume instruction apparatus 20 includes a stop notification receiving unit 21, a parameter acquisition unit 22, a display control unit 23, and a resume request transmission unit 24. These functional units may be implemented by a CPU of the resume instruction apparatus 20 executing one or more programs that are installed on the resume instruction apparatus 20, for example. The program may be a script included in a web page, for example. In this case, the resume instruction apparatus 20 may include a web browser that is capable of interpreting such a script, for example.

The stop notification receiving unit 21 receives the flow job stop notification transmitted from the flow management server 10. The parameter acquisition unit 22 acquires parameters of the flow job specified in the stop notification from the flow management server 10. The display control unit 23 displays a screen for changing the values of the parameters acquired by the parameter acquisition unit 22 (hereinafter referred to as "parameter edit screen"). The resume request transmission unit 24 transmits a flow job resume request to the flow management server 10 after the values of the parameters are changed by the user via the parameter edit screen. The changed parameter values are included in the flow job resume request.

Note that in the present embodiment, the process unit 13 executes the intermediate process, the stop process, and the output process of the process units (input process, intermediate process, stop process, and output process) constituting a workflow. In the input process, various types of external devices may be the input source of data to be processed. Also, the input method for inputting the data (acquisition method or receiving method as viewed from the flow management server 10) may vary depending on the type of the external device. In order to flexibly adapt to such circumstances, the job input unit 11 may have a configuration as illustrated in FIG. 4, for example.

Figure 4:
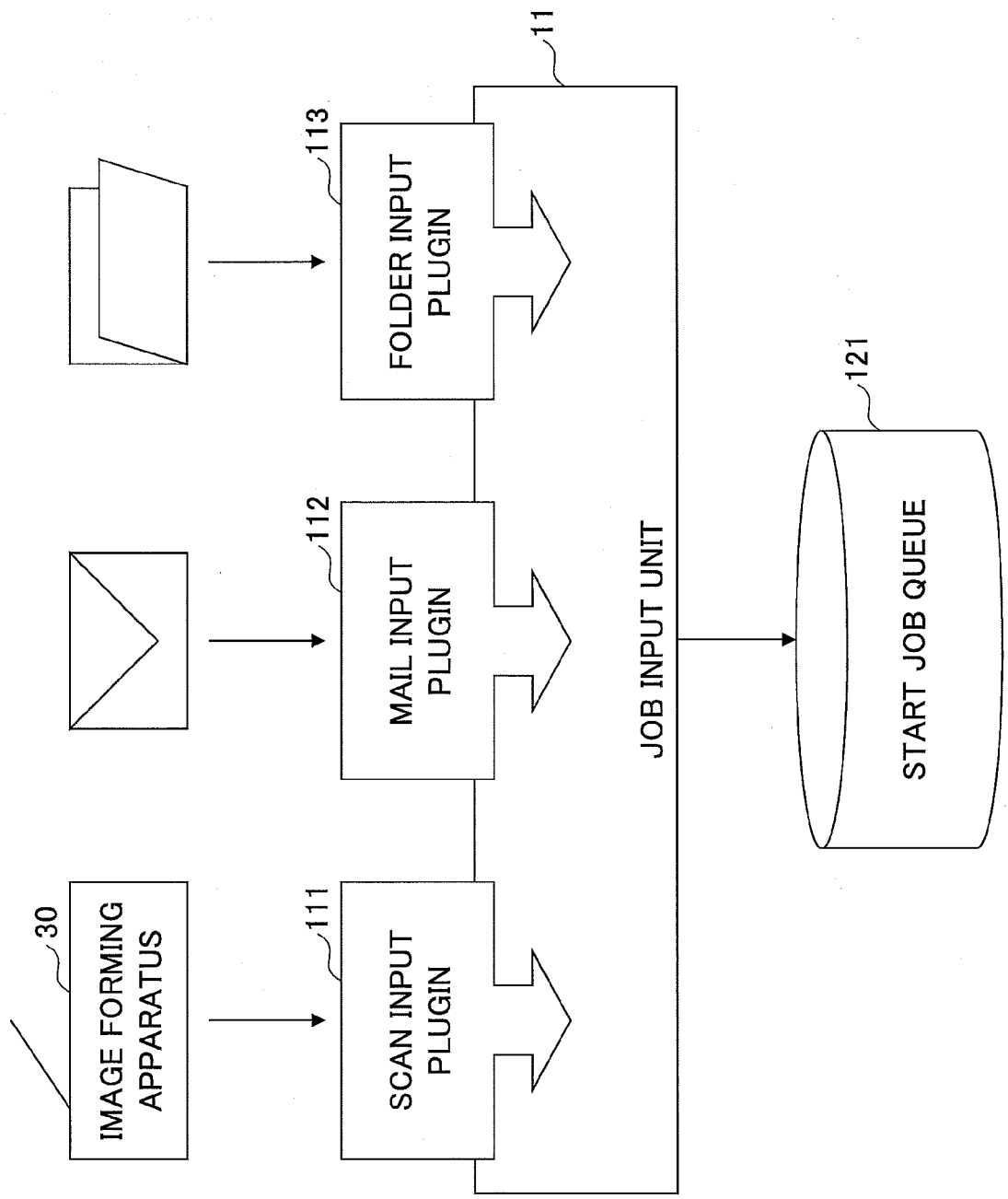
FIG. 4 illustrates an exemplary configuration of a job input unit.

FIG. 4 illustrates an exemplary configuration of the job input unit 11. As with the process unit 13, data exchange between the job input unit 11 and an input source of data may be implemented by a plugin corresponding to a program module that can be plugged into the job input unit 11. In FIG. 4, a scan input plugin 111, a mail input plugin 112, and a folder input plugin 113 are illustrated as examples of plugins installed on the job input unit 11.

The scan input plugin 111 is a plugin for receiving input data from the image forming apparatus 30. That is, the scan input plugin 111 is configured to receive from the image forming apparatus 30 image data scanned by the image forming apparatus 30 as input data. The scan input plugin 111 receives from the image forming apparatus 30 information such as a flow ID along with the image data. The scan input plugin 111 generates job information in a format prescribed by the flow execution control unit 12 based on the received flow ID and the image data and stores the job information in the start job queue 121. Note that the flow ID is identification information for identifying each workflow definition (i.e. each flow definition data).

The mail input plugin 112 is a plugin for accepting a workflow execution request via an email addressed to a predetermined email address. In this case, data that is attached to the email may be the data to be processed by the workflow. The data to be processed may be image data or data in some other format. The mail input plugin 112 acquires the email addressed to the predetermined email address from a mail server (not shown). The mail input plugin 112 generates job information in a format prescribed by the flow execution control unit 12 based on the data attached to the acquired email and information such as the flow ID described in the email and stores the job information in the start job queue 121.

The folder input plugin 113 is a plugin for accepting a workflow execution request by uploading a file in a predetermined folder. The predetermined folder may be a folder created in the secondary storage unit 102 of the flow management server 10, or a folder created in a storage unit that is connected to the flow management server 10 via a network (e.g. storage unit of a file server, which is not shown), for example. The folder input plugin 113 may poll (periodically reference) the predetermined folder, and if a file storing data to be processed (hereinafter referred to as "data file") and a file storing information such as a flow ID and setting values (hereinafter referred to as "bibliographic file") are stored in the predetermined folder, the folder input plugin 113 may acquire the stored data file and bibliographic file. The folder input plugin 113 generates job information in a format prescribed by the flow execution control unit 12 based on information stored in the acquired data file and the acquired bibliographic file and stores the job information in the start job queue 121.

Note that plugins for inputting data other than those described above may be added to the job input unit 11. For example, a plugin for accepting input data via a web page may be added.

As can be appreciated, according to an aspect of the present embodiment, process units such as an input process, an intermediate process, a stop process, and an output process may each be implemented by a plugin. Accordingly, a wider variety of workflows may be defined and implemented by creating a plugin for executing a desired process and adding the created plugin, for example.

Figure 5:
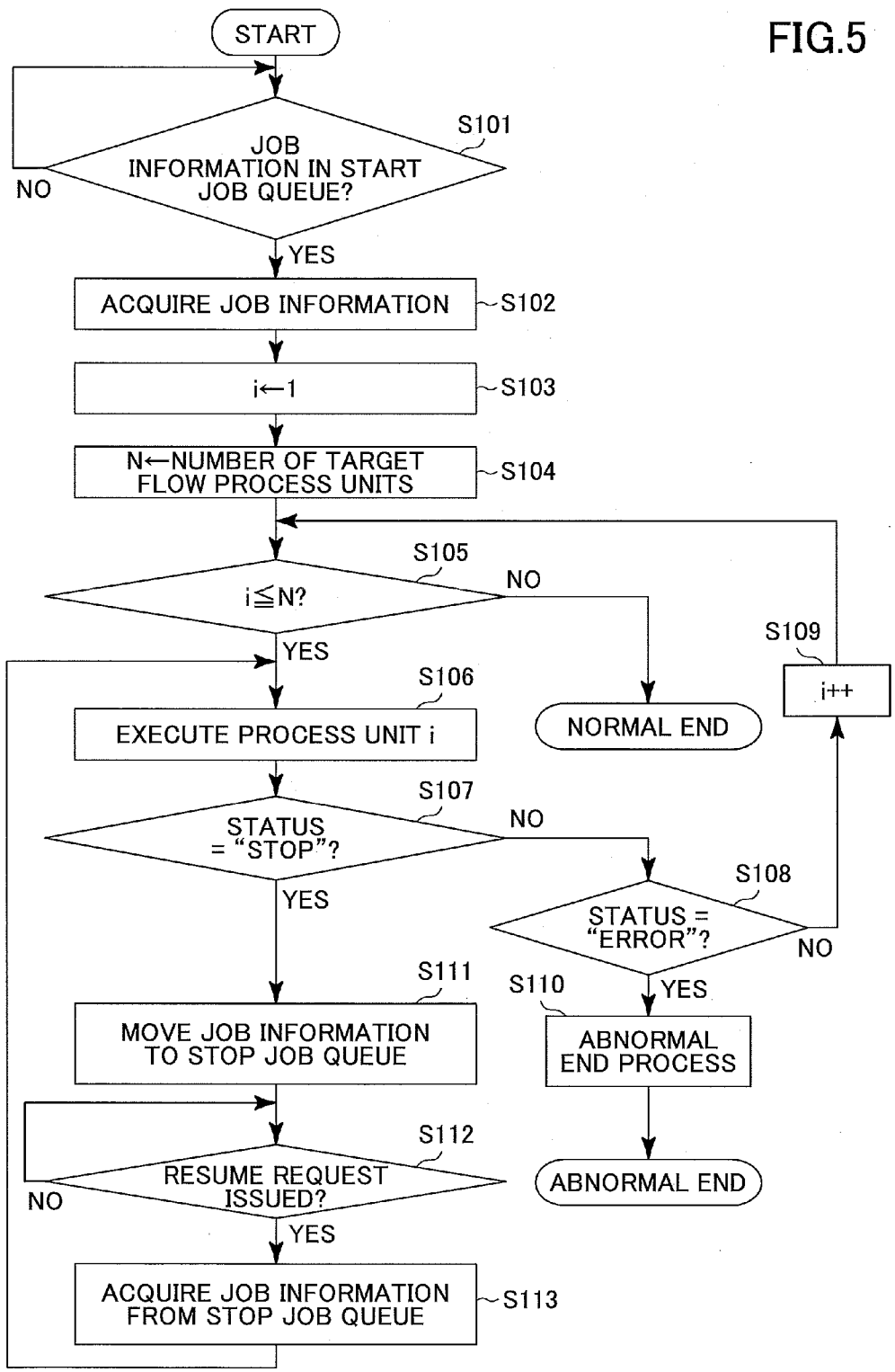
FIG. 5 is a flowchart illustrating exemplary process steps executed by a flow execution control unit according to an embodiment of the present invention.

In the following, process steps executed by the flow management server 10 are described. FIG. 5 is a flowchart illustrating exemplary process steps executed by the flow execution control unit 12.

The job input unit 11 may periodically reference the start job queue 121 to determine whether job information is stored in the start job queue 121 (step S101). If job information is stored in the start job queue 121 (YES in step S101), the job input unit 11 retrieves the job information from the start job queue 121 and moves the job information to the executing job storage unit 123 (step S102). In other words, the retrieved job information is deleted from the start job queue 121.

Then, the flow execution control unit 12 assigns "1" to a variable "i" (step S103). The variable "i" is a variable for storing the execution order of process units of a flow job to be executed (hereinafter referred to as "target flow job"). Note that in the descriptions below, a process unit to be executed i-th according to the execution order is referred to as "process unit i". Then, the flow execution control unit 12 assigns the total number of process units constituting the target flow job to the variable "N" (step S104). The total number of process units constituting the target flow job may be determined based on the job definition data.

Then, the flow execution control unit 12 determines whether the value of the variable "i" is less than or equal to the variable "N" (step S105). That is, the flow execution control unit 12 determines whether there is an unexecuted process unit among the process units constituting the target flow job.

If the value of the variable "i" is less than or equal to the variable "N", that is, if there is an unexecuted process unit (YES in step S105), the flow execution control unit 12 prompts the corresponding process unit 13 to execute the process unit i (step S106). For example, the flow execution control unit 12 may send an execution request to the corresponding process unit 13 to execute the process unit i. The execution request may include identification information of the target flow job (hereinafter referred to as "job ID"), for example. Upon receiving the execution request, the corresponding process unit 13 executes the process unit i based on the job information and returns a status of the process unit i to the flow execution control unit 12. In the present embodiment, the status of a process unit may take the values "completed", "stop", or "error". "Completed" indicates that the process unit has been successfully completed. "Stop" indicates that the process unit is temporarily stopped (suspended). "Error" indicates that the process unit has ended abnormally.

Then, the flow execution control unit 12 determines whether the returned status is "stop" (step S107). If the status is not "stop" (NO in step S107), the flow execution control unit 12 determines whether the status is "error" (step S108). If the status is not "error" (NO in step S108), the flow execution control unit 12 adds 1 to the variable "i" (step S109), and repeats the process from step S105 and onward.

In other words, if the returned status is "completed", a subsequent process unit is executed.

On the other hand, if the status is "error" (YES in step S108), the flow execution control unit 12 executes an abnormal end process (step S110). For example, flow execution control unit 12 may move the job information of the target flow job that is stored in the executing job storage unit 123 to an area storing job information of a flow job flow that has ended in failure. After the abnormal end process is completed, the target flow job is ended.

If the status is "stop" (YES in step S107), the flow execution control unit 12 moves the job information of the target flow job from the executing job storage unit 123 to the stop job queue 122 (step S111). As a result, progress of the target flow job is suspended. Note that in the present embodiment, the process unit 13 that returns the status "stop" to the flow execution control unit 12 corresponds to the stop process unit 13*b*.

Then, the flow execution control unit 12 waits for a resume request for resuming the target flow job to be issued (step S112). When a resume request for resuming the target flow job is issued (YES in S112), the flow execution control unit 12 moves the job information of the target flow job that is stored in the stop job queue 122 to the executing job storage unit 123 (step S113). Then, the process steps from step S106 and onward are repeated. Note that the process that has been stopped is executed (resumed) in step S106 in response to the resume request. That is, the stop process unit 13*b* resumes the process that has been stopped in response to the resume request, and this time, the process unit 13*b* returns the status "completed" to the flow execution control unit 12. In this way, the process operations of the flow job may be resumed.

Figure 6:
FIG. 6 illustrates a specific example of a workflow according to an embodiment of the present invention.

In the following, an embodiment of the present invention is described with respect to a specific example. FIG. 6 illustrates a specific example of a workflow according to an embodiment of the present invention.

As illustrated in FIG. 6, in the present embodiment, first, an OCR process is executed with respect to image data included in the job information transmitted from the image forming apparatus 30. By executing the OCR process, text data extracted from the image data may be output. Then, a stop process is executed. By executing the stop process, the user may be given an opportunity to edit the text data. Then, a mail transmission process is executed. In the mail transmission process, an email having text data reflecting a change made by the user on the OCR process result included as a subject may be transmitted to an email address set up in the job definition data. Note that in the present embodiment, the user is also given an opportunity to edit the email address along with the opportunity to edit the text data in the stop process.

The flow definition data of the workflow illustrated in FIG. 6 may be defined by a data structure as illustrated in FIG. 7, for example. FIG. 7 illustrates an example of flow definition data 500 according to the present embodiment. In the example of FIG. 7, the flow definition data 500 is defined in the XML (eXtensible Markup Language) format. However, the flow definition data may be described in other data formats such as the CSV (Comma Separated Values) format, for example.

In FIG. 7, the flow definition data 500 includes flow elements enclosed by <flow> tags as root elements. The flow elements include an id element 510 and one or more plugin elements 520-540 as child elements. The value of the id element 510 ("Flow1") corresponds to a flow ID.

The plugin element is a definition of a process unit. The flow definition data 500 includes the plugin element 520 corresponding to the OCR process, the plugin element 530 corresponding to the stop process, and the plugin element 540 corresponding to the mail transmission process. Each plugin element includes an order attribute. The value of the order attribute indicates the execution order of the process unit that is being defined by the plugin element. Also, each plugin element includes an id element, a displayName element, and a parameters element as child elements.

The value of the id element corresponds to identification information of the program (plugin) for prompting the flow management server 10 to function as the process unit 13 for executing a corresponding process unit. The flow execution control unit 12 may call the process unit 13 based on the value of the id element. The value of the displayName element corresponds to a character string to be displayed above a figure representing a corresponding process unit within an edit screen relating to the flow definition data. The parameters element is where an input parameter with respect to a corresponding process unit may be specified and/or a process result (output information) of the corresponding process unit may be recorded, for example. The input parameter and the output information may vary with respect to each process unit. Thus, the value structure of the parameters element may vary according to each process unit.

For example, the parameters element of the plugin element 520 corresponding to the OCR process includes a keyword element 521. The keyword element 521 stores a result of the OCR process. In FIG. 7, the value of the keyword element 521 is empty. This is because the flow definition data 500 of FIG. 7 represents a state in which the result of the OCR process is not yet determined. That is, after the OCR process is executed based on job definition data generated from the flow definition data 500, a character string extracted by the OCR process is recorded in the keyword element 521.

The parameters element of the plugin element 530 corresponding to the stop process includes a panel element 531, a panelAddress element 532, a panelSize element 533, a maxWaitingTime element 534, an errorHandling element 535, and displayParameter elements 536-539. The value of the panel element 531 indicates the type of the resume instruction apparatus 20 corresponding to the transmission destination of a stop notification. For example, "mfp" represents an image forming apparatus. The value of the panelAddress element 532 indicates the IP address of the resume instruction apparatus 20. The value of the panelSize element 533 indicates a screen size of a display device of the resume instruction apparatus 20. The value of the maxWaitingTime element 534 indicates the maximum waiting time for a resume request to be issued after a flow job is stopped. The value of the errorHandling element 535 indicates a process to be executed in a case where a resume request is not issued even after the maximum waiting time elapses. For example, "skip" indicates skipping the process unit (stop process). The values of the displayParameter elements represent identification information of parameter values to be output (for display or editing) at the resume instruction apparatus 20. The identification information is described in the following format: "<value of id element of plugin element>/<tag name of element corresponding to parameter>". For example, the value "ocr/keyword" of the displayParameter element 536 indicates that the parameter value of the keyword element 521 of the plugin element 520 that includes the id element value "ocr" as a child element is to be output (displayed). The value "smtp/to1" of the displayParameter 537 indicates the parameter value of a to1 element 543 of the plugin element 540 that includes the id element value "smtp" as a child element is to be output (displayed).

The parameters element of the plugin element 540 corresponding to the mail transmission process includes a serverIp element 541, a portNumber element 542, the to1 element 543, a cc1 element 544, a cc2 element 545, and a subject element 546. The value of the serverIp element 541 indicates an IP address of an SMTP server corresponding to a destination of a request for transmitting an email. The value of the portNumber element 542 indicates a port number of the SMTP server corresponding to the mail transmission request destination. The value of the to1 element 543 indicates a first destination address of the email to be transmitted. The value of the cc1 element 544 indicates a first Cc address of the email to be transmitted. The value of the cc2 element 545 indicates a second Cc address of the email to be transmitted. The value of the subject element 546 indicates the subject of the email to be transmitted. Note that in the illustrated example, the value of subject element 546 is enclosed in curly brackets. This indicates that a value identified by the identification information specified within the curly brackets is to be used. The identification information "ocr/keyword" in the curly brackets identifies the value of the keyword element 521 in the plugin element 520 that includes the id element value "ocr". In other words, "ocr/keyword" identifies the character string extracted by the OCR process. Thus, the subject element 546 indicates that the character string extracted by the OCR process is to be used as the subject of the email.

Note that each child element of each of the parameters elements of the plugin elements 520, 530, and 540 includes a type attribute, an r attribute, and a w attribute. The value of the type attribute indicates the data type of the parameter value specified in the child element. The value of the r attribute indicates whether the user is able (allowed) to reference the corresponding parameter value when the flow job is executed. The value of the w attribute indicates whether the user is able (allowed) to write or update the parameter value when the flow job is executed. With respect to the r attribute and w attribute values, "true" indicates that the corresponding parameter value can be referenced or written, and "false" indicates that the corresponding parameter value cannot be referenced or written.

When the job input unit 11 accepts an execution request for executing a workflow with the flow ID "Flow1", the job input unit 11 may generate job definition data as illustrated in FIG. 8 based on the flow definition data 500 as illustrated in FIG. 7.

FIG. 8 illustrates an example of job definition data 600a in an initial state according to the present embodiment. Note that features illustrated in FIG. 8 that are substantially identical to those illustrated in FIG. 7 are given the same reference numerals and their descriptions are omitted.

In FIG. 8, the job definition data 600a includes a jobInfo element as a root element. In other words, the job definition data 600a in the initial state includes a copy of the flow definition data 500 and the jobInfo element added thereto as the parent element of the flow element. The jobInfo element includes an id element 610 as a child element in addition to the flow element. The value of the id element 610 indicates a job ID. The job ID may be assigned by the job input unit 11, for example.

In step S102 of FIG. 5, job information including job definition data as illustrated in FIG. 8 is acquired. If the value of the variable "i" is "1", the OCR process unit 13a references the plugin elements included in the job definition data 600a and executes an OCR process on image data included in the job information based on the plugin element 520 that has the value "1" as the order attribute. A character string output as a result of the OCR process by the OCR process unit 13a is written in the keyword element 521 of the job definition data 600a.

FIG. 9 illustrates an example of job definition data after the OCR process is executed according to the present embodiment. Note that features illustrated in FIG. 9 that are substantially identical to those illustrated in FIG. 8 are given the same reference numerals and their descriptions are omitted.

In the job definition data 600b illustrated in FIG. 9, the value "abc" is added as the value of the keyword element 521. In other words, the job definition data 600b illustrates an example in which the character string "abc" has been extracted by an OCR process, and the job definition data 600a has been updated to reflect the OCR process result.

In the following, an exemplary case is described in which the variable "i" is "2". That is, a stop process that is executed based on the plugin element 530 of the job definition data 600b is described.

Figure 10:
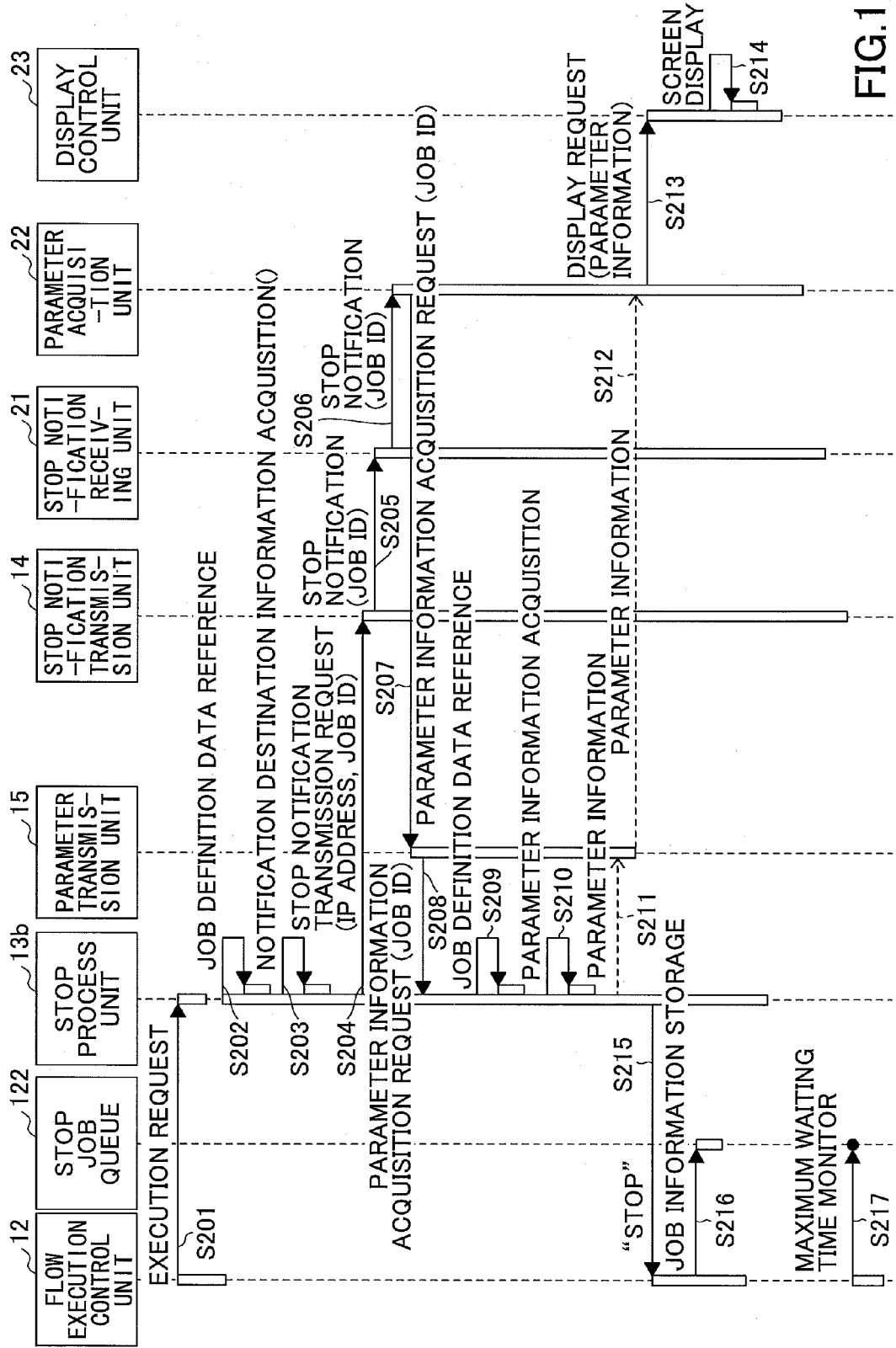
FIG. 10 is a sequence chart illustrating exemplary process steps of a stop process according to an embodiment of the present invention.
Figure 11:
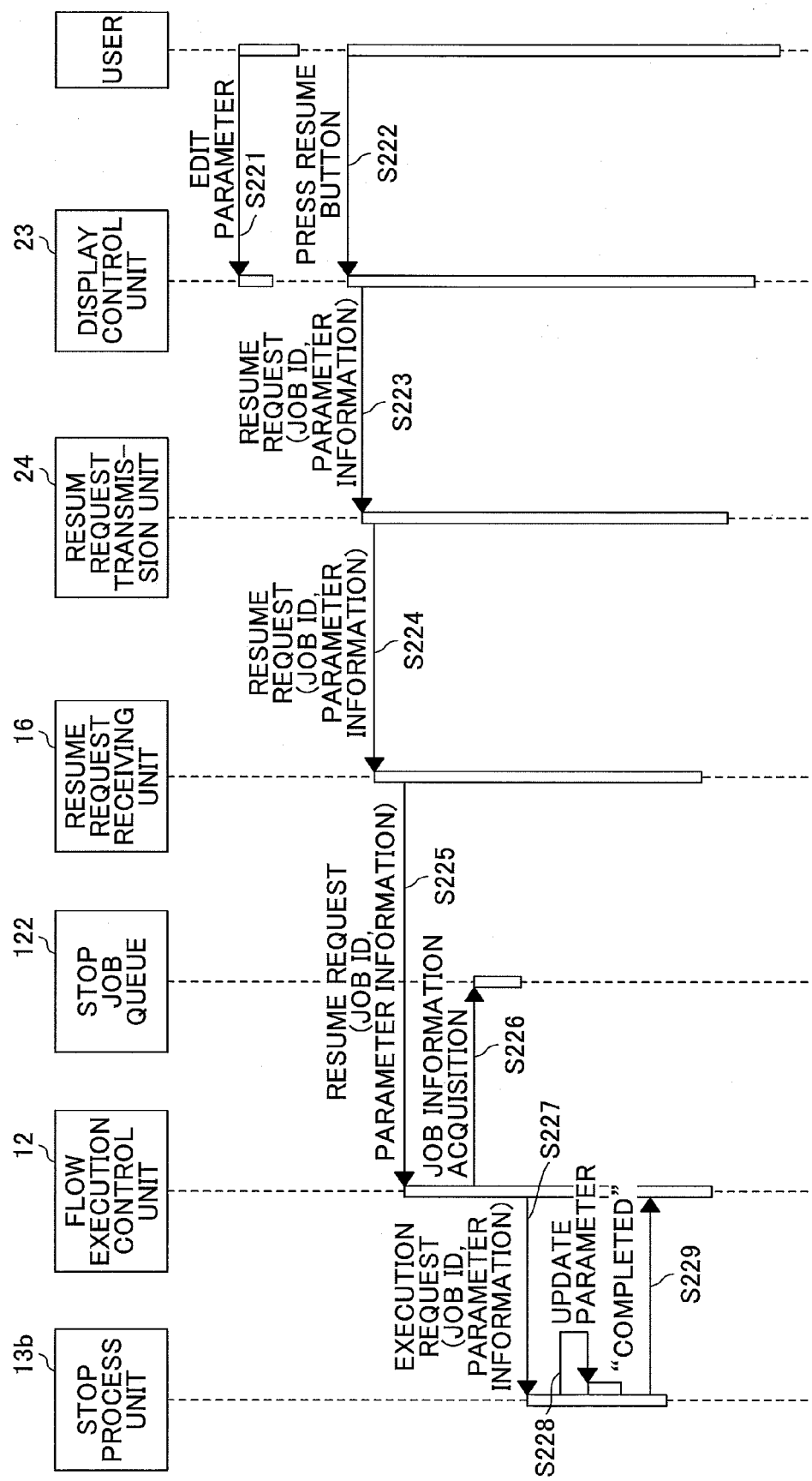
FIG. 11 is a sequence chart illustrating further exemplary process steps of the stop process.

FIGS. 10 and 11 are sequence charts illustrating exemplary process steps of the stop process.

In step S201, the flow execution control unit 12 transmits an execution request for executing a stop process to the stop process unit 13b that is identified based on the value ("suspend") of the id element within the plugin element 530 of the job definition data 600b. Note that the execution request transmitted from the flow execution control unit 12 to the stop process unit 13b may include a job ID of the flow job to be executed (hereinafter referred to as "target job ID"), for example.

Then, the stop process unit 13b refers to the job definition data 600b included in the job information identified by the target job ID (step S202), and acquires notification destination information from the job definition data 600b (step S203). The notification destination information refers to information on the destination of a stop notification. In the job definition data 600b according to the present embodiment, the panel element 531, the panelAddress element 532, and the panelSize element 533 correspond to the notification destination information.

Then, the stop process unit 13b transmits a stop notification transmission request to the stop notification transmission unit 14 to have a stop notification transmitted to an IP address included in the destination information (step S204). The stop notification transmission request includes the IP address as well as the target job ID. Then, the stop notification transmission unit 14 transmits the stop notification including the target job ID to the resume instruction apparatus 20 with the corresponding IP address specified in the stop notification transmission request (step S205). Note that in a case where two or more sets of notification destination information are included in the plugin element 530 of the job definition data 600b (FIG. 9), the stop notification may be transmitted to two or more resume instruction apparatuses 20, for example.

Then, the stop notification receiving unit 21 of the resume instruction apparatus 20 corresponding to the stop notification transmission destination receives the stop notification and conveys the received stop notification to the parameter acquisition unit 22 (step S206). The parameter acquisition unit 22 specifies the job ID included in the stop notification in a parameter information acquisition request for acquiring parameter information subject to editing and transmits the parameter information acquisition request to the parameter transmission unit 15 of the flow management server 10 corresponding to the sender of the stop notification (step S207). Note that address information of the parameter transmission unit 15 may be included in the stop notification, for example. Upon receiving the parameter information acquisition request, the parameter transmission unit 15 conveys the received acquisition request to the stop process unit 13b (step S208).

The stop process unit 13b refers to the job definition data 600b identified by the job ID designated in the parameter information acquisition request (step S209), and acquires parameter information from the job definition data 600b (step S210). In the present embodiment, the displayParameter elements 536-539 included in the job definition data 600b are acquired. In this case, parameter values within the job definition data 600b that are identified by the identification information represented by the values of the displayParameter elements 536-539 are acquired. The acquired values are included in the parameter information in association with the displayParameter elements 536-539 corresponding to their acquisition source. For example, based on the value "ocr/keyword" of the displayParameter element 536, the value of the keyword elements 521 ("abc") is associated with the displayParameter element 536. Based on the value "smtp/to1" of the displayParameter element 537, the value of the to1 element 543 ("xxx1@abc.com") is associated with the displayParameter element 537. Based on the value "smtp/cc1" of the displayParameter 538, the value of the cc1 element 544 ("xxx2@abc.com") is associated with the displayParameter element 538. Based on the value "smtp/cc2" of the displayParameter 539, the value of the cc2 element 545 ("xxx3@abc.com") is associated with the displayParameter element 539.

Then, the stop process unit 13b conveys the acquired parameter information to the parameter transmission unit 15 and requests the parameter transmission unit 15 to transmit the parameter information to the sender of the parameter information acquisition request (step S211). Note that in some embodiments, the panel element 531 and the panelSize element 533 included in the notification destination information may be transmitted along with the parameter information, for example. Then, the parameter transmission unit 15 transmits the parameter information to the resume instruction apparatus 20 corresponding to the sender of the parameter information acquisition request (step S212). The parameter acquisition unit 22 of the resume instruction apparatus 20 receives the parameter information, specifies the parameter information in a display request for displaying the parameter information on a parameter edit screen, and transmits the display request to the display control unit 23 (step S213). The display control unit 23 generates a parameter edit screen for accepting edits (changes) on the parameter information and controls the display unit of the resume instruction apparatus 20 to display the generated parameter edit screen (step S214). Note that in some embodiments, in the case where other relevant information relating to the display unit such as the panel element 531 and the panelSize element 533 are received along with the parameter information, the parameter edit screen may be generated based on such relevant information as well. In this way, a general-purpose generation logic may be used by the display control unit 23 in various types of the resume instruction apparatus 20 to generate the parameter edit screen. That is, a program for causing a device to function as a display control unit 23 of the resume instruction apparatus 20 may be less dependent on a particular type of the resume instruction apparatus 20, for example.

FIG. 12 illustrates an exemplary display of a parameter edit screen 810 before parameter information is edited. In FIG. 12, the parameter edit screen 810 includes a display area for each displayParameter element included in the received parameter information that has the value "true" for the r attribute. Each display area displays a parameter value associated with the corresponding displayParameter element. For example, in the parameter edit screen 810, a display area 811 displays a value that is associated with the displayParameter element 536. Also, a display area 812 displays a value that is associated with the displayParameter element 537. Also, a display area 813 displays a value that is associated with the displayParameter element 538. Also, a display area 814 displays a value that is associated with the displayParameter element 539.

Note that if the value of the w attribute of the corresponding displayParameter element of the display area is "true", the displayed parameter value may be edited, and if the value of the w attribute is "false", the displayed parameter cannot be edited.

After the stop process unit 13*b* requests for transmission of the parameter information (step S211), the stop process unit 13*b* returns a "stop" status to the flow execution control unit 12 (step S215). Upon receiving the "stop" status, the flow execution control unit 12 moves the job information of the target flow job that is stored in the executing job storage unit 123 to the stop job queue 122 (step S216). Note that in some embodiments, the job information may remain stored in the executing job storage unit 123. In this case, information indicating that the corresponding flow job described by the job information is currently stopped may be added to the job information. In this way, the job information may be identified as that relating to a flow job that is currently suspended.

Then, the flow execution control unit 12 starts monitoring the maximum waiting time (step S217). The maximum waiting time is the value of the maxWaitingTime element 534 of the job definition data 600*b*.

Note that steps S201-S215 of FIG. 10 correspond to the process performed in step S106 of FIG. 5 in the case where the value of the variable "i" is "2". Also, step S216 corresponds to step S111 of FIG. 5.

Referring to FIG. 11, the user of the resume instruction apparatus 20 is then given an opportunity to edit (change) the parameter values as is necessary or desired via the parameter edit screen 810 (step S221). In the present example, it is assumed that the parameter values have been edited (changed) to those illustrated in FIG. 13.

Figure 13:
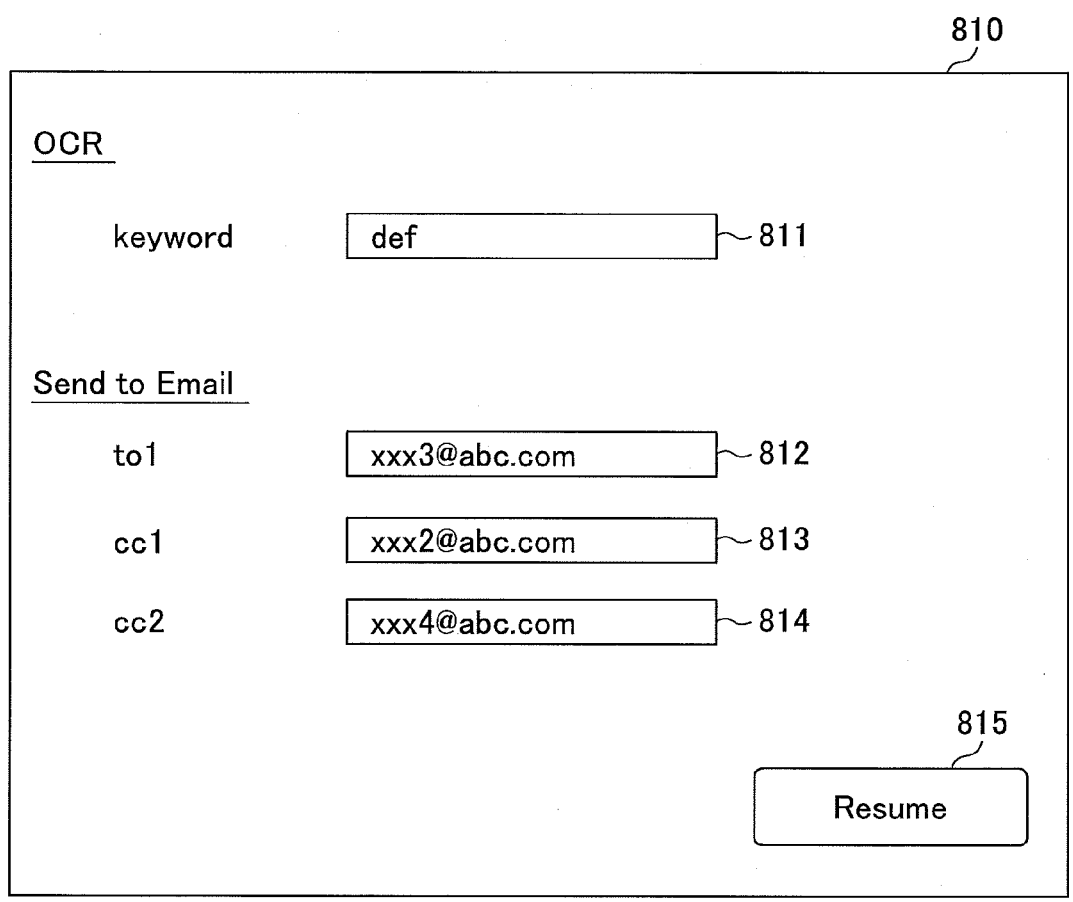
FIG. 13 illustrates an exemplary display of the parameter edit screen after the parameter information is edited.

FIG. 13 illustrates an exemplary display of the parameter edit screen 810 after parameter information has been edited. Note that features illustrated in FIG. 13 that may be substantially identical to those illustrated in FIG. 12 are given the same reference numerals. In FIG. 13, the value for "keyword" in the display area 811 is changed to "def", the value for "to1" in the display area 812 is changed to "xxx3@abc.com", and the value for "cc2" in the display area 814 is changed to "xxx4@abc.com". Note that in response to the editing of the parameters, the display control unit 23 updates the parameter values associated with the corresponding displayParameter elements.

After editing of the parameter values is completed and a resume button 815 of the parameter edit screen 810 is pressed (step S222), the display control unit 23 requests the resume request transmission unit 24 to transmit a resume request for resuming the flow job (step S223). The resume request includes the target job ID of the target flow job and the changed parameter information reflecting the changes (edits) made via the parameter edit screen 810.

The resume request transmission unit 24 transmits the resume request to the flow management server 10 (step S224). The resume request is received by the resume request receiving unit 16 of the flow management server 10. The resume request receiving unit 16 conveys the received resume request to the flow execution control unit 12 (step S225).

Upon receiving the resume request, the flow execution control unit 12 acquires the job information identified by the job ID that is included in the resume request from the stop job queue 122 and moves the acquired job information to the executing job storage unit 123 (step S226). Then, the flow execution control unit 12 transmits an execution request to the stop process unit 13*b* once again to prompt the stop process unit 13*b* to resume execution of the stop process for which the value "stop" has been set up as its status (step S227). The execution request includes the target job ID of the target flow job and the parameter information included in the resume request.

Upon receiving the execution request once again, the stop process unit 13*b* updates the relevant parameter values in the job definition data 600*b* based on the changed parameter information included in the execution request (step S228). That is, the value of each parameter identified by each displayParameter element included in the parameter information is updated to the value included in the parameter information associated with the corresponding displayParameter element. As a result, the job definition data 600*b* may be converted to job definition data 600*c* as illustrated in FIG. 14, for example.

FIG. 14 illustrates an example of job definition data according to the present embodiment after changes have been made to parameters. In the job definition data 600*c* illustrated in FIG. 14, the value of the keyword element 521 has been changed to "def", the value of the to1 element 543 has been changed to "xxx3@abc.com", and the value of the cc2 element 545 has been changed to "xxx4@abc.com".

Then, the stop process unit 13*b* returns a "completed" status to the flow execution control unit (step S229). In this way, the flow execution control unit 12 may recognize that the execution of the stop process by the stop process unit 13*b* has been completed. In turn, the flow execution control unit 12 transmits an execution request to the mail transmission process unit 13*c* that is to execute a next process unit of the flow job. Note that the mail transmission process unit 13*c* transmits an email based on the changed parameters. For example, the value "def" may be indicated as the subject of the email. Also, "xxx3@abc.com" may be indicated as the destination address of the email. Also, "xxx2@abc.com" and "xxx4@abc.com" may be indicated as Cc addresses of the email.

Note that when step S225 of FIG. 11 is executed, a positive determination (YES) is made in step 112 of FIG. 5. Also, step S226 of FIG. 11 corresponds to step S113 of FIG. 5, and step S227 of FIG. 11 corresponds to step S106 that is executed after step S113 of FIG. 5.

Also, note that if the user does not make any edits to the parameter information, and the maximum waiting time from the execution of step S217 of FIG. 10 elapses before step S225 of FIG. 11 is executed, the flow execution control unit 12 may determine that the stop process (parameter change) should be skipped based on the value ("Skip") of the errorHandling elements 535 of the job definition data 600*b*.

Accordingly, the flow execution control unit 12 may transmit an execution request to the mail transmission process unit 13c to execute a next process unit of the flow job.

Note that in the above-described embodiment, parameters that affect the process operations of one process unit (mail transmission process) are changed. However, in other embodiments, one or more parameters that affect the process flow of the target flow job may be changed. For example, in a case where the process flow of a workflow branches out, one or more parameters used for determining the branching conditions of the process flow may be subject to change. In this way, a user may be able to change the process flow of a workflow upon executing a flow job, for example.

As described above, according to an aspect of the present embodiment, the stop process unit 13b may provide a user with an opportunity to change one or more parameters relating to a flow job. When one or more parameters are changed, the process units to be executed after the stop process of the stop process unit 13b may be executed based on the changed parameters. In this way, flexibility of the flow job may be enhanced, for example.

Note that aspects of the present invention may be applied to workflows other than the combination of process units as illustrated in FIG. 6. Also, in some embodiments, two or more stop processes may be incorporated into one workflow, for example. Also, in a case where a stop notification is to be transmitted to a plurality of resume instruction apparatuses 20, for example, information may be set up in the parameters element of the plugin element 530 of the flow definition data 500 indicating whether to maintain the stopped state until resume requests are received from all of the resume instruction apparatuses 20, or cancel the stopped state after resume requests are received from a part of the resume instruction apparatuses 20. Further, in the case where such information indicates that the stopped state should be maintained until resume requests are received from all of the resume instruction apparatuses 20, for example, the flow execution control unit 12 may wait until step S225 is executed with respect to all of the resume instruction apparatuses 20 corresponding to the plurality of stop notification transmission destinations before executing step S226 and the subsequent process steps. On the other hand, in the case where such information indicates that the stopped state should be cancelled after resume requests are received from a part of the resume instruction apparatuses 20, for example, the flow execution control unit 12 may execute step S226 and the subsequent process steps after step S225 is executed with respect to a part of the resume instruction apparatuses 20 corresponding to the plurality of stop notification transmission destinations. The part of the resume instruction apparatuses 20 may be a specific number of the resume instruction apparatuses 20, or one or more specific resume instruction apparatuses 20 specified by their IP addresses, for example.

Further, in some embodiments, the flow management server 10 and the resume instruction apparatus 20 may be implemented by the same apparatus.

Note that the flow management server 10 of the above-described embodiment is an example of an information processing apparatus and an information processing system. The flow execution control unit 12 is an example of a process control unit. The stop process is an example of a first process unit. The parameter transmission unit 15 is an example of an output unit. The resume request receiving unit 16 is an example of an accepting unit. The transmission of parameter information by the parameter transmission unit 15 is an example of causing the resume instruction apparatus 20 to display (output) information in a form changeable (editable) by a user.

Although the present invention has been described above with reference to certain illustrative embodiments, the present invention is not limited to these embodiments, and numerous variations and modifications may be made without departing from the scope of the present invention.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any non-transitory storage medium for storing processor readable code such as a floppy disk, a hard disk, a CD ROM, a magnetic tape device or a solid state memory device. The non-transitory storage medium can comprise any computer-readable medium except for a transitory, propagating signal.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU and the RAM may operate as a physical memory or a primary memory of the apparatus, while the HDD may operate as a secondary memory of the apparatus.

The present application is based on and claims the benefit of priority of Japanese Patent Application No. 2014-054477 filed on Mar. 18, 2014, the entire contents of which are hereby incorporated by reference.

What is claimed is:

1. An information processing apparatus comprising:
a processor that executes a program, stored in a memory, to implement
a process control unit configured to execute one or more process units with respect to input data in an order defined by definition information;
an output unit configured to cause information to be output in a form changeable by a user when a first process unit of the one or more process units is stopped, the information output by the output unit including at least one of output information of a process unit executed before the first process unit and input information set up in the definition information with respect to a process unit to be executed after the first process unit; and an accepting unit configured to accept changed information corresponding to the information output by the output unit that is changed by the user;

wherein the process control unit controls execution of the process unit to be executed after the first process unit based on the changed information accepted by the accepting unit, and wherein, in a case where a predetermined time elapses after the information is output by the output unit, the process control unit controls execution of the process unit to be executed after the first process unit without waiting for the accepting unit to accept the changed information.

2. The information processing apparatus as claimed in claim 1, wherein the output unit causes the information to be output to an output destination that is defined in the definition information.

3. The information processing apparatus as claimed in claim 1, wherein the information output by the output unit includes information defined as an output object in the definition information.

4. An information processing system including at least one computer, the information processing system comprising:

a processor that executes a program, stored in a memory, to implement a process control unit configured to execute one or more process units with respect to input data in an order defined by definition information;

an output unit configured to cause information to be output in a form changeable by a user when a first process unit of the one or more process units is stopped, the information output by the output unit including at least one of output information of a process unit executed before the first process unit and input information set up in the definition information with respect to a process unit to be executed after the first process unit; and an accepting unit configured to accept changed information corresponding to the information output by the output unit that is changed by the user;

wherein the process control unit controls execution of the process unit to be executed after the first process unit based on the changed information accepted by the accepting unit, and wherein, in a case where a predetermined time elapses after the information is output by the output unit, the process control unit controls execution of the process unit to be executed after the first process unit without waiting for the accepting unit to accept the changed information.

5. The information processing system as claimed in claim 4, wherein the output unit causes the information to be output to an output destination that is defined in the definition information.

6. The information processing system as claimed in claim 4, wherein the information output by the output unit includes information defined as an output object in the definition information.

7. An information processing method that is implemented by an information processing system including at least one computer, the information processing method comprising:

a process control step of executing one or more process units with respect to input data in an order defined by definition information;

an output step of causing information to be output in a form changeable by a user when a first process unit of the one or more process units is stopped, the information output by the output step including at least one of output information of a process unit executed before the first process unit and input information set up in the definition information with respect to a process unit to be executed after the first process unit; and an accepting step of accepting changed information corresponding to the information output by the output step that is changed by the user;

wherein the process control step includes controlling execution of the process unit to be executed after the first process unit based on the changed information accepted in the accepting step, and wherein, in a case where a predetermined time elapses after the information is output by the output step, the process control step includes controlling execution of the process unit to be executed after the first process unit without waiting for the changed information to be accepted in the accepting step.

8. The information processing method as claimed in claim 7, wherein the output step includes causing the information to be output to an output destination that is defined in the definition information.

9. The information processing method as claimed in claim 7, wherein the information output by the output step includes information defined as an output object in the definition information.

* * * * *